United States Patent [19]

Fidler et al.

[11] Patent Number: 4,603,085
[45] Date of Patent: Jul. 29, 1986

[54] PROCESS FOR PREPARING DECORATIVE FOAMED PHOSPHATE CERAMIC MATERIALS

[75] Inventors: Carrielee Fidler, Pequea Township, Lancaster County; Louis Goldfarb, Manheim Township, Lancaster County; Nancy E. Mentzer, Lancaster; Donald J. Misselhorn, East Hempfield Township, Lancaster County, all of Pa.

[73] Assignee: Armstrong World Industries, Inc., Lancaster, Pa.

[21] Appl. No.: 750,142

[22] Filed: Jul. 1, 1985

[51] Int. Cl.$^4$ .................... B32B 5/14; B32B 33/00
[52] U.S. Cl. ........................ 428/409; 65/22; 427/271; 427/419.2; 428/312.6
[58] Field of Search ............... 65/22, 23; 427/271, 427/419.2; 428/141, 158, 312.6, 312.8, 409, 410

[56] References Cited

U.S. PATENT DOCUMENTS

| | | | |
|---|---|---|---|
| 3,742,110 | 6/1973 | Kejelland-Fosterud | 428/312.6 |
| 3,825,468 | 7/1974 | Wojcik et al. | 428/312.6 |
| 3,845,182 | 10/1974 | Biskup et al. | 264/45.1 |
| 3,867,491 | 4/1975 | Martel | 156/78 |
| 3,914,492 | 10/1975 | Wisotzky et al. | 428/151 |
| 3,939,021 | 2/1976 | Nishibayashi et al. | 428/172 |
| 3,959,541 | 5/1976 | King et al. | 428/312.6 |
| 4,024,309 | 5/1977 | Pender | 65/22 |
| 4,375,516 | 3/1983 | Barrall | 501/84 |
| 4,430,108 | 2/1984 | Hojaji | 65/22 |

*Primary Examiner*—William J. Van Balen
*Attorney, Agent, or Firm*—Laird F. Miller

[57] ABSTRACT

The present invention relates to a method by which a composition which will provide a foamed phosphate ceramic material is cast upon a support surface comprising regions having a substantially smooth character, being of relatively low surface energy, and having the ability to release from the cured phosphate material. In those regions where the smooth coating contacts the phosphate open cells will result, whereas in other regions closed cells will result. One preferred substrate against which the phosphate material can be cast is a wax material.

12 Claims, No Drawings

PROCESS FOR PREPARING DECORATIVE FOAMED PHOSPHATE CERAMIC MATERIALS

The present invention relates to phosphate ceramic materials, and more particularly to a process for preparing such materials having decorative surface features.

BACKGROUND OF THE INVENTION

Recently, U.S. Pat. No. 4,375,516 disclosed phosphate ceramic materials which could be prepared in rigid form from a composition comprising a metal oxide, calcium silicate and phosphoric acid. As disclosed therein, the resulting products could be used in a variety of building products.

In view of their potential uses, various procedures were used to provide building products having decorative finishes, examples of which are embossing techniques and color printing techniques; nevertheless, such decorative features are not satisfactory in all circumstances. Accordingly, it was desired to find a process by which selected portions of a phosphate ceramic surface could be provided with open celled areas which provided an enhanced, three-dimensional appearance.

One approach by which this effect may be achieved is by selectively treating certain portions of the surface of an uncured composition with a basic material. The base reacts with the phosphoric acid present in the initial composition to yield open cells; however, because the base must react with the acid, the base must be applied at a point in time before the board is cured; i.e., before the acid is neutralized by the curing process. For a number of reasons, this is not a particularly satisfactory approach.

Accordingly, one objective of the present invention was to provide a simple means by which a portion of a phosphate ceramic surface could be provided with an open-celled, three-dimensional character.

A second object of the present invention was to provide a method by which such features could be provided to the board on a continuous basis without the necessity of utilizing an acid-base reaction.

These and other objectives of the present invention will become apparent from the detailed description of preferred embodiments which follows.

SUMMARY OF THE INVENTION

The present invention relates to a method by which a composition which will provide a foamed phosphate ceramic material is cast upon a support surface comprising regions having a substantially smooth character, being of relatively low surface energy, and having the ability of release from the cured phosphate material. In those regions where the smooth coating contacts the phosphate, open cells will result, whereas in other regions closed cells will result. One preferred substrate against which the phosphate material can be cast is a wax material.

DETAILED DESCRIPTION OF PREFFERED EMBODIMENTS

In one embodiment, the present invention relates to a process for providing a foamed phosphate ceramic material having a decorative surface, said process comprising the steps of providing a composition suitable to provide a foamed phosphate ceramic material, said composition comprising calcium silicate, phosphoric acid, a metal oxide, and a carbonate foaming agent; providing a support surface, selected regions of said surface being substantially smooth and having a surface energy of 35 ergs/cm$^2$ or less, said regions being capable of providing an open-celled surface character to said composition when said composition is interfaced therewith and allowed to foam and cure, said regions being capable of releasing from said cured composition; and coating said composition to react, whereby a foamed material is obtained comprising open cells in the regions of the decorative surface which are in contact with said selected regions of said support surface.

In a second embodiment, the present invention relates to a foamed phosphate ceramic material having selected surface regions comprising open-celled foam, said material having been obtained from the reaction of a composition comprising calcium silicate, phosphoric acid, a metal oxide, and a carbonate foaming agent residing on a support surface, selected regions of said support surface corresponding to said open-celled foam regions having been substantially smooth, having had a surface energy of 35 ergs/cm$^2$ or less, and having been a material which released from the cured foamed material.

The compositions which may be used to practice the present invention are those which comprise at least one metal oxide, calcium silicate, phosphoric acid, and a carbonate foaming agent, provided that the composition is suitable to provide a rigid water resistant phosphate ceramic material. Examples of such compositions are disclosed in the aforementioned U.S. Patent; however, other compositions which provide rigid phosphate ceramic materials may also be used.

When cast on conventional high energy support surfaces such as steel, the aforementioned compositions have typically provided structures having closed-cell foam facings and/or structures in which the foamed material adhered to the high energy surface. Surprisingly, however, it has been found that if the above compositions are cast on a support surface which consists of, or is entirely or partially coated with low-energy, substantially smooth coating materials, products are produced in which open cells are found in those portions of the surface which interfaced with the coating materials. However, if the smooth nature of the coating is destroyed, either intentionally or unintentionally, the ability of the coating to provide open-celled products may be lost.

Surface energy studies have disclosed that surfaces which have surface energies of 35 ergs/cm$^2$ or less will provide the desired open-celled effects. Such measurements may be made by immersion calorimetry, as disclosed by A. W. Adamson in Physical Chemistry of Surfaces (4th Ed.), John Wiley and Sons, NY (1982), or by other means well known in the art. The surface may consist entirely of a smooth material which is non-liquid at room temperature and which has an appropriate low surface energy, with the closed-cell regions of the products being provided by selectively roughening the surface, or it may comprise a support surface having selectively applied smooth surfacing materials which are non-liquid at room temperature and which have low surface energies so as to provide the desired open-celled structures. Examples of the latter materials are wax, polyethylene, plasticized and unplasticized polyvinyl chloride, polytetrafluoroethylene and other related halocarbon polymers. Other types of support surfaces such as glass, aluminum, and polyurethane surfaces which have higher surface energies and are also non-liquid provide closed-celled structures. Of course it will also be recognized that, rather than comprising separate regions which provide a segregated open-celled character, the entire surface may be a single region which yields only open-celled products; thus, the term "regions" as used herein will be deemded to include a single region comprising the entire support surface.

Although a variety of non-liquid coatings may be utilized to practice the present invention, wax materials are preferred. Waxes are not only inexpensive in comparison to the other types of coatings, but they may also be periodically heat-treated so as to regenerate a substantially smooth surface. By way of comparison, other types of coatings are not only more expensive to prepare, but they are also more expensive to resurface. Accordingly, wax materials are often the surface materials of choice. Nevertheless, wax materials are not problem free. Because wax is a relatively soft solid under the conditions of use as disclosed herein, it does have a tendency to scratch easily, and also to retain some of the foamed material on its surface. Thus, with time and even when regenerated, it tends to lose the ability to provide a consistent open-celled character. Consequently, it must be replaced periodically.

It has also been discovered that certain coating materials, such as polymeric materials, which have surface energies slightly in excess of 35 ergs/cm$^2$ can be treated with low energy liquids such as mineral oil so as to reduce the surface energy level of the coating system to a level of 35 ergs/cm$^2$ or less. Examples of materials for which such treatment is suitable are polymethylmethacrylate and filled silicone rubber materials which have surface energies of about 40 to 50 ergs/cm$^2$. High energy materials such as aluminum, however, are not amenable to such treatment. It will be recognized, of course, that low-energy surfaces may also be coated with low-energy liquids without adverse effect.

As yet another consideration, the support material must have the ability to release from the cured foamed material; i.e., it must not bond to the foam. One way that the release characteristics of a surface may be estimated is by measuring the amount of foamed material which is retained by the surface. The more material which is retained, the less satisfactory are the release characteristics. Of course, the ability of the retained material to adversely affect release may vary depending on its density; however, for purposes of the present invention, a coating material will usually be considered as satisfactory if it retains not more than about 1 mg of foam residue for each square centimeter of surface area.

The present invention will be more readily understood by reference to the examples which follow, the examples being presented by way of illustration and not limitation.

EXAMPLES

EXAMPLE 1

The following example will illustrate a composition which is suitable to provide a water resistant, phosphate ceramic material. A composition was prepared as described in U.S. Pat. No. 4,375,516 comprising the following components.

| Component | Weight (grams) |
| --- | --- |
| Calcium silicate | 51.0 |
| Magnesium oxide | 3.5 |
| Talc | 4.0 |
| Magnesium carbonate | 0.5 |
| Phosphoric acid (85%) | 46.7 |
| Aluminum oxide trihydrate | 9.34 |
| Magnesium chloride | 6.25 |
| Glass fibers (⅛ in.) | 0.45 |
| Water | 12.71 |

This composition was prepared by rapid mixing, and was then immediately cast at a thickness of 0.2 inch on each of the substrates described in the following examples. The applied castings foamed to a thickness of ca. 0.5 inch and self-cured to give rigid products.

EXAMPLE 2

This example will illustrate the preparation of products which were selectively provided with open-celled regions. A series of steel plates was treated such that a portion of each was provided with one of the coatings indicated below. Surface energy measurements were made by immersion calorimetry according to the method of Adamson, supra. In addition, the amount of residue per cm$^2$ was measured to estimate the ability of the material to release from the foamed product.

| Substrate | Surface Energy (ergs/cm$^2$) | Residue (mg/cm$^2$) |
| --- | --- | --- |
| Wax (Parafflex 1550 from Boler Petroleum Co.) | 25.5 | <1 |
| Polyethylene | 31.7 | <1 |
| Polyvinyl chloride (unplasticized) | 29.0 | <1 |
| Polytetrafluoroethylene | 19.5 | <1 |

Each plate was coated with the composition described in Example 1. Upon separating each product from the plate, each was found to have an open-celled pattern corresponding to the selectively coated regions of the plate. However, when the respective regions of the plate were roughened such that the surfaces were no longer smooth, closed-celled patterns were obtained.

EXAMPLE 3

This example will illustrate coating materials which, alone, were unsuitable. Samples were treated in the manner described for Example 2. Variable amounts of residues were obtained, the surface energies were above 35 ergs/cm$^2$, and closed-celled foam facings were obtained.

| Substrate | Surface Energies (ergs/cm$^2$) | Residue (mg/cm$^2$) |
| --- | --- | --- |
| Silicone rubber | * | variable |
| Iron | 100 | >3 |
| Copper | 60 | >3 |
| Silica glass | 120 | >3 |
| Polymethylmethacrylate | 40 | variable |

*not measured

EXAMPLE 4

This example will illustrate the advantages to be obtained by overcoating a low-energy surface with a coating of a low-energy liquid. The polytetrafluoroethylene coating of Example 2 was provided with a thin (ca 1 mil) coating of mineral oil. The composition of Example 1 was cast against this surface and the amount of residue was measured. No measurable amount of residue remained on the surface.

The present invention is not restricted solely to the descriptions and illustrations provided above, but encompasses all modifications envisaged by the following claims.

What is claimed is:

1. A process for providing a foamed phosphate ceramic material having a decorative surface, said process comprising the steps of providing a composition suitable to provide a foamed phosphate ceramic material, said composition comprising calcium silicate, phosphoric acid, a metal oxide, and a carbonate foaming agent;

providing a support surface, selected regions of said surface being substantially smooth and having a surface energy of 35 ergs/cm$^2$ or less, said regions being capable of providing an open-celled surface character to said composition when said composition is interfaced therewith and allowed to foam and cure, said regions being capable of releasing from said cured composition; and coating said composition on said support surface and permitting said composition to react, whereby a foamed material is obtained comprising open cells in the regions of the decorative surface which are in contact with said selected regions of said support surface.

2. The process as set forth in claim 1 hereof wherein said selected regions comprise a coating material which is a non-liquid coating material.

3. The process as set forth in claim 2 hereof wherein said coating material is selected from the group consisting of a wax or wax blend, polyethylene, plasticized or unplasticized polyvinyl chloride and polytetrafluoroethylene.

4. The process as set forth in claim 3 hereof wherein said coating material comprises a wax.

5. The process as set forth in claim 2 hereof wherein said coating material comprises an additional coating of a low-energy liquid coating material.

6. The process as set forth in claim 1 hereof wherein said selected regions comprise a polymeric non-liquid material having a surface energy of greater than 35 ergs/cm$^2$ and a low energy liquid coating thereon.

7. A foamed phosphate ceramic material having selected surface regions comprising open-celled foam, said material having been obtained from the reaction of a composition comprising calcium silicate, phosphoric acid, a metal oxide and a carbonate foaming agent residing on a support surface, selected regions of said support surface corresponding to said open-celled foam regions having been substantially smooth, having had a surface energy of 35 ergs/cm$^2$ or less, and having been a material which released from the cured foamed material.

8. The product as set forth in claim 7 hereof wherein said regions of said support surface comprised coating material which was a non-liquid coating material.

9. The product as set forth in claim 8 hereof wherein said coating material was selected from the group consisting of a wax or a wax blend, polyethylene, plasticized or unplasticized polyvinyl chloride and polytetrafluoroethylene.

10. The product as set forth in claim 9 hereof wherein said coating material comprised a wax.

11. The product as set forth in claim 8 hereof wherein said coating material comprised an additional coating of a low-energy liquid material.

12. The product as set forth in claim 7 hereof wherein said selected regions comprised a polymeric non-liquid material having a surface energy of greater than 35 ergs/cm$^2$ and a low-energy liquid coating thereon.

* * * * *